(12) United States Patent
Garbow et al.

(10) Patent No.: US 8,713,450 B2
(45) Date of Patent: Apr. 29, 2014

(54) DETECTING PATTERNS OF ABUSE IN A VIRTUAL ENVIRONMENT

(75) Inventors: Zachary Adam Garbow, Rochester, MN (US); Linda Irene Larson, Rochester, MN (US); Candace Trielle Pederson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1166 days.

(21) Appl. No.: 11/970,571

(22) Filed: Jan. 8, 2008

(65) Prior Publication Data
US 2009/0177979 A1    Jul. 9, 2009

(51) Int. Cl.
| G06F 3/00 | (2006.01) |
| G06F 11/34 | (2006.01) |
| G06F 21/31 | (2013.01) |
| G06F 3/048 | (2013.01) |
| G06Q 50/26 | (2012.01) |
| G06Q 50/00 | (2012.01) |
| G06Q 30/02 | (2012.01) |
| H04L 29/06 | (2006.01) |

(52) U.S. Cl.
CPC . *G06F 3/00* (2013.01); *G06F 11/34* (2013.01); *G06F 11/3438* (2013.01); *G06F 2221/21* (2013.01); *G06F 21/316* (2013.01); *G06F 3/048* (2013.01); *G06Q 50/265* (2013.01); *G06Q 50/01* (2013.01); *G06Q 30/0248* (2013.01); *H04L 63/14* (2013.01)
USPC ............. 715/751; 705/325; 726/26; 715/764; 715/753

(58) Field of Classification Search
CPC . G06Q 50/265; G06Q 50/01; G06Q 30/0248; G06F 21/316; G06F 2221/21; G06F 11/34; G06F 11/3438; G06F 3/00; G06F 3/048; H04L 63/14
USPC .......................................................... 715/757
See application file for complete search history.

(56) References Cited

U.S. PATENT DOCUMENTS

| 6,437,777 | B1 | 8/2002 | Kamachi et al. |
| 6,772,195 | B1 | 8/2004 | Hatlelid et al. |
| 6,951,516 | B1 | 10/2005 | Eguchi et al. |
| 7,143,358 | B1 | 11/2006 | Yuen |
| 7,240,368 | B1 | 7/2007 | Roesch et al. |
| 7,353,390 | B2 | 4/2008 | Chandley et al. |
| 7,690,990 | B2 | 4/2010 | Van Luchene |
| 7,720,733 | B2 | 5/2010 | Jung et al. |
| 7,841,008 | B1 | 11/2010 | Cole et al. |
| 8,096,882 | B2 | 1/2012 | Jung et al. |
| 8,099,668 | B2 * | 1/2012 | Garbow et al. ............... 715/751 |

(Continued)

OTHER PUBLICATIONS

U.S. Patent Application entitled, "Predator and Abuse Identification and Prevention in a Virtual Environment," filed Jan. 7, 2008, U.S. Appl. No. 11/970,105.

(Continued)

*Primary Examiner* — Patrick Riegler
(74) *Attorney, Agent, or Firm* — Patterson & Sheridan LLP (57) ABSTRACT

Embodiments of the invention provide techniques for detecting patterns of abuse in users of a virtual world. The patterns of abuse may be detected by examining records of inappropriate interactions between users. Subsequently, preventative actions may be taken to prevent further abuse. The preventative actions may include blocking access to all or part of the virtual world, blocking interactions with other users, warning other users, or notifying authorities of the behavior of the other user.

21 Claims, 5 Drawing Sheets

(56) References Cited

U.S. PATENT DOCUMENTS

| | | |
|---|---|---|
| 2002/0198940 A1* | 12/2002 | Bower et al. .................. 709/204 |
| 2003/0171927 A1 | 9/2003 | Bernard |
| 2003/0220980 A1 | 11/2003 | Crane |
| 2004/0111479 A1* | 6/2004 | Borden et al. ................ 709/206 |
| 2004/0153514 A1 | 8/2004 | Crane |
| 2006/0045082 A1 | 3/2006 | Fertell et al. |
| 2006/0089905 A1* | 4/2006 | Song et al. ...................... 705/39 |
| 2006/0212925 A1 | 9/2006 | Shull et al. |
| 2006/0253784 A1* | 11/2006 | Bower et al. .................. 715/738 |
| 2006/0293103 A1 | 12/2006 | Mendelsohn |
| 2007/0011273 A1 | 1/2007 | Greenstein et al. |
| 2007/0013691 A1 | 1/2007 | Jung et al. |
| 2007/0050214 A1 | 3/2007 | Hawks et al. |
| 2007/0087756 A1 | 4/2007 | Hoffberg |
| 2007/0111794 A1 | 5/2007 | Hogan et al. |
| 2007/0118607 A1 | 5/2007 | Nelissen |
| 2008/0005319 A1* | 1/2008 | Anderholm et al. .......... 709/224 |
| 2008/0013392 A1 | 1/2008 | Ishikawa |
| 2008/0026847 A1 | 1/2008 | Mueller et al. |
| 2008/0026857 A1 | 1/2008 | Grazia |
| 2008/0059198 A1* | 3/2008 | Maislos et al. ................ 704/273 |
| 2008/0081701 A1 | 4/2008 | Shuster |
| 2008/0133392 A1 | 6/2008 | Jung et al. |
| 2008/0162202 A1* | 7/2008 | Khanna et al. .................... 705/7 |
| 2008/0189380 A1* | 8/2008 | Bosworth et al. ............. 709/207 |
| 2008/0207327 A1 | 8/2008 | Van Luchene et al. |
| 2009/0049513 A1* | 2/2009 | Root et al. ......................... 726/1 |
| 2009/0079816 A1* | 3/2009 | Qvarfordt et al. .......... 348/14.16 |
| 2009/0089417 A1* | 4/2009 | Giffin et al. .................... 709/224 |
| 2009/0113554 A1* | 4/2009 | Zalewski ......................... 726/26 |
| 2009/0132689 A1 | 5/2009 | Zaltzman et al. |
| 2009/0150778 A1 | 6/2009 | Nicol, II |
| 2009/0157323 A1 | 6/2009 | Jung et al. |
| 2009/0225074 A1 | 9/2009 | Bates et al. |
| 2009/0235350 A1 | 9/2009 | Garbow et al. |

OTHER PUBLICATIONS

Aggarwal, S. et al., Anti-Cyberstalking: The Predator and Prey Alert (PAPA) System, First International Workshop on Systematic Approaches to Digital Forensic Engineering, Nov. 2005, pp. 195-205, IEEE Computer Society, Los Alamitos, CA, United States.

Rosenblum, David. What Anyone Can Know: The Privacy of Social Networking Sites. IEEE Security & Privacy. vol. 5 Issue: 3. Pub. Date: 2007. Relevant pp. 40-49. Found on the World Wide Web at: http://ieeexplore.ieee.org/stamp/stamp.jsp?tp=&arnumber=4218550.

* cited by examiner

DETECTING PATTERNS OF ABUSE IN A VIRTUAL ENVIRONMENT

BACKGROUND OF THE INVENTION

1. Field of the Invention

Embodiments of the invention relate to immersive virtual environments. More specifically, embodiments of the invention relate to protecting a child user from inappropriate interactions within an immersive virtual environment.

2. Description of the Related Art

A virtual world is a simulated environment which users may inhabit and in which the users may interact with virtual objects and locations of the virtual world. Users may also interact with one another via avatars. An avatar generally provides a graphical representation of an individual within the virtual world environment. Avatars are usually presented to other users as two or three-dimensional graphical representations of humanoids. Frequently, virtual worlds allow for multiple users to enter and interact with one another. Virtual worlds provide an immersive environment as they typically appear similar to the real world, with real world rules such as gravity, topography, locomotion, real-time actions, and communication. Communication may be in the form of text messages sent between avatars, real-time voice communication, gestures displayed by avatars, symbols visible in the virtual world, and the like.

Virtual worlds may be persistent. A persistent world provides an immersive environment (e.g., a fantasy setting used as a setting for a role-playing game, or a virtual world complete with land, buildings, towns, and economies) that is generally always available, and world events happen continually, regardless of the presence of a given avatar. Thus, unlike more conventional online games or multi-user environments, the virtual world continues to exist, and plots and events continue to occur as users enter (and exit) the virtual world.

SUMMARY OF THE INVENTION

One embodiment of the invention includes a computer-implemented method for detecting patterns of abuse in users of a virtual world. The method generally includes providing, on a computer readable storage medium, a plurality of definitions of inappropriate interactions between users of the virtual world, the inappropriate interactions being defined on the basis of leading to potential harm to users of the virtual world. The method also includes receiving one or more indications of an interaction between a first user and a second user of the virtual world. The method also includes, upon determining that the indications correspond to at least one of the plurality of definitions of inappropriate interactions, performing the steps of: adding, to a plurality of records of previous inappropriate interactions, a record of the inappropriate interaction; determining, based on the plurality of records, a pattern of inappropriate interactions for the second user; and, if the determined pattern indicates abusive behavior towards other users of the virtual environment, then performing one or more actions to prevent further abuse by the second user.

Another embodiment of the invention includes a computer-readable storage medium containing a plurality of definitions of inappropriate interactions between users of the virtual world, the inappropriate interactions being defined on the basis of leading to potential harm to users of the virtual world. The computer-readable storage medium also includes a program, which when executed on a processor performs an operation for detecting patterns of abuse in users of a virtual world. The operation may generally include receiving one or more indications of an interaction between a first user and a second user of the virtual world. The operation may also include, upon determining that the indications correspond to at least one of the plurality of definitions of inappropriate interactions, performing the steps of: adding, to a plurality of records of previous inappropriate interactions, a record of the inappropriate interaction; determining, based on the plurality of records, a pattern of inappropriate interactions for the second user; and, if the determined pattern indicates abusive behavior towards other users of the virtual environment, then performing one or more actions to prevent further abuse by the second user.

Still another embodiment of the invention includes a system having a processor, a computer-readable storage medium and a memory. The computer-readable storage medium may contain a plurality of definitions of inappropriate interactions between users of the virtual world, the inappropriate interactions being defined on the basis of leading to potential harm to users of the virtual world. The memory may store a program, which when executed by the processor, is configured to detect patterns of abuse in users of a virtual world. The program, when executed by the processor, is configured to protect a child user of a virtual world by performing the step of receiving one or more indications of an interaction between a first user and a second user of the virtual world. The program may also be configured, upon determining that the indications correspond to at least one of the plurality of definitions of inappropriate interactions, to perform the steps of: adding, to a plurality of records of previous inappropriate interactions, a record of the inappropriate interaction; determining, based on the plurality of records, a pattern of inappropriate interactions for the second user; and, if the determined pattern indicates abusive behavior towards other users of the virtual environment, then performing one or more actions to prevent further abuse by the second user.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

A virtual world is a simulated environment in which users may be represented by avatars. An avatar may be used to "travel" through locations of the virtual world, such as virtual streets, buildings, rooms, etc. While in a given location, an avatar may also be used to interact with objects or other avatars present therein. For example, an avatar may be able to approach another avatar, and may interact with the other avatar by communicating, performing financial transactions, and the like. Thus, multiple users, although in different physical locations, may be present in the same virtual location, and may interact therein by using their respective avatars.

However, some problems of interacting in the physical world may also occur in the virtual world. In particular, child users (e.g., users below the age of 18 years) of a virtual world may be subject to inappropriate interactions with other users. Such inappropriate interactions may include bullying, stalking, exploitation, fraud, intimidation, and sexual harassment. Typically, adult users may be able to defend themselves against inappropriate actions of others, but children may not be able to recognize such situations, or may not know how to react to them.

Embodiments of the invention provide techniques for protecting a child user from harm due to inappropriate interactions within an immersive virtual environment. The inappropriate interactions may be detected by examining characteristics of the interactions between a child and another user (e.g., communications, transactions, etc.), by monitoring physical signs of stress in the child (e.g., based on facial gestures, heart rate, etc.), or by receiving software commands given by the child to signal discomfort in a particular situation. Subsequently, preventative actions may be determined based on a level of severity of the inappropriate interaction. The preventative actions may include notifying the parents of the child, altering the virtual world to end the interaction, or notifying authorities of the behavior of the other user.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive and DVDs readable by a DVD player) on which information is permanently stored; and (ii) writable storage media (e.g., floppy disks within a diskette drive, a hard-disk drive or random-access memory) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
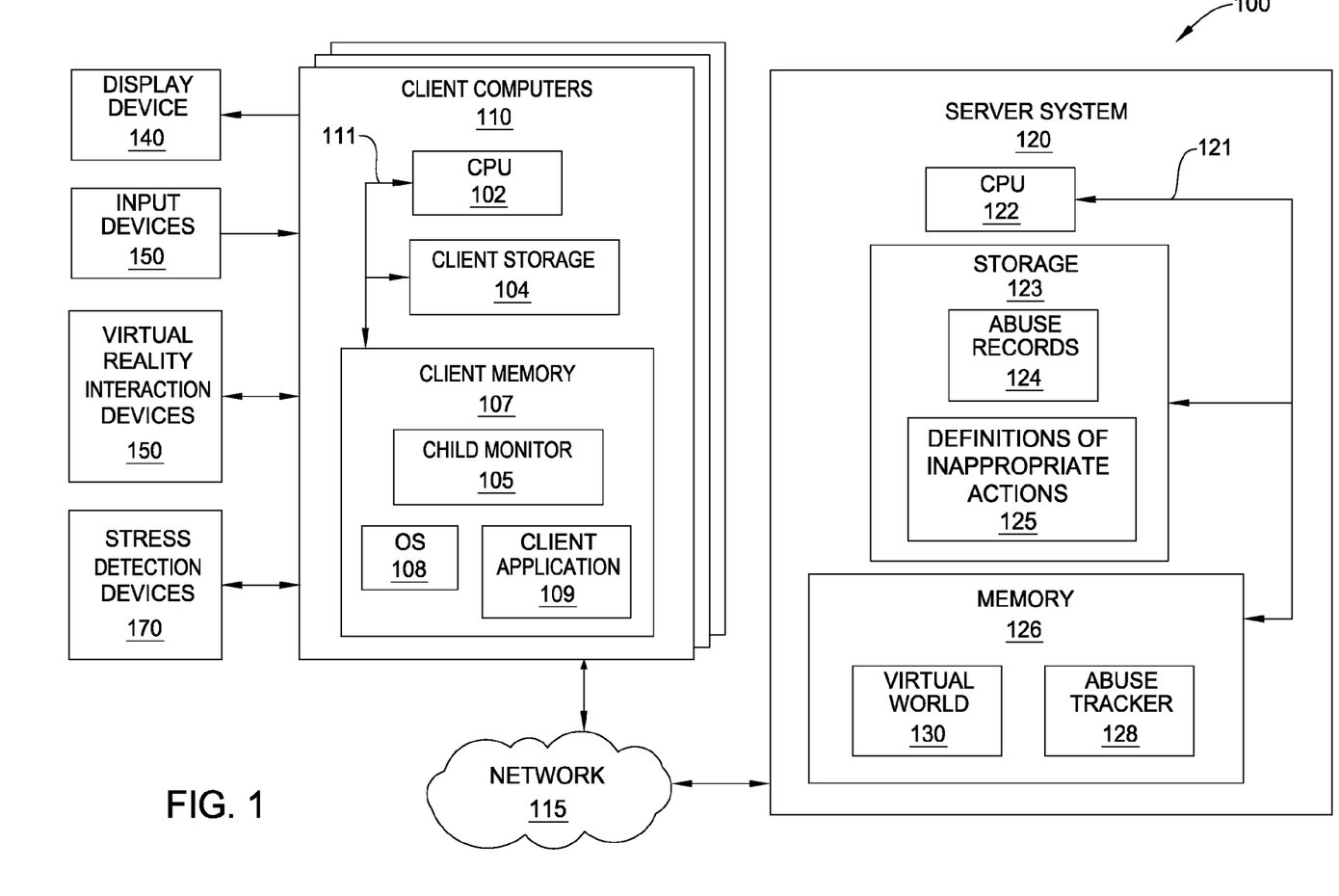
FIG. 1 is a block diagram that illustrates a client server view of an exemplary computing environment, according to one embodiment of the invention.

FIG. 1 is a block diagram that illustrates a client server view of computing environment 100, according to one embodiment of the invention. As shown, computing environment 100 includes client computers 110, network 115 and server system 120. In one embodiment, the computer systems illustrated in environment 100 may include existing computer systems, e.g., desktop computers, server computers, laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

As shown, each client computer 110 includes a central processing unit (CPU) 102, which obtains instructions and data via a bus 111 from client memory 107 and client storage 104. CPU 102 is a programmable logic device that performs all the instruction, logic, and mathematical processing in a computer. Client storage 104 stores application programs and data for use by client computer 110. Client storage 104 includes hard-disk drives, flash memory devices, optical media and the like. Client computer 110 is operably connected to the network 115.

Client memory 107 includes an operating system (OS) 108, a client application 109 and an abuse monitor 105. Operating system 108 is the software used for managing the operation of the client computer 110. Examples of OS 108 include UNIX, a version of the Microsoft Windows® operating system, and distributions of the Linux® operating system. (Note, Linux is a trademark of Linus Torvalds in the United States and other countries.)

In one embodiment, the client application 109 provides a software program that allows a user to connect to a virtual world 130, and once connected, to perform various user actions. Such actions may include exploring virtual locations, interacting with other avatars, and interacting with virtual objects. Further, the client application 109 may be configured to generate and display a visual representation of the user within the immersive environment, generally referred to as an avatar. The avatar of the user is generally visible to other users in the virtual world, and the user may view avatars representing the other users. The client application 109 may also be configured to generate and display the immersive environment to the user and to transmit the user's desired actions to the virtual world 130 on the server 120. Such a display may include content from the virtual world determined from the user's line of sight at any given time. For the user, the display may include the avatar of that user or may be a camera eye where the user sees the virtual world through the eyes of the avatar representing this user.

Figure 2:
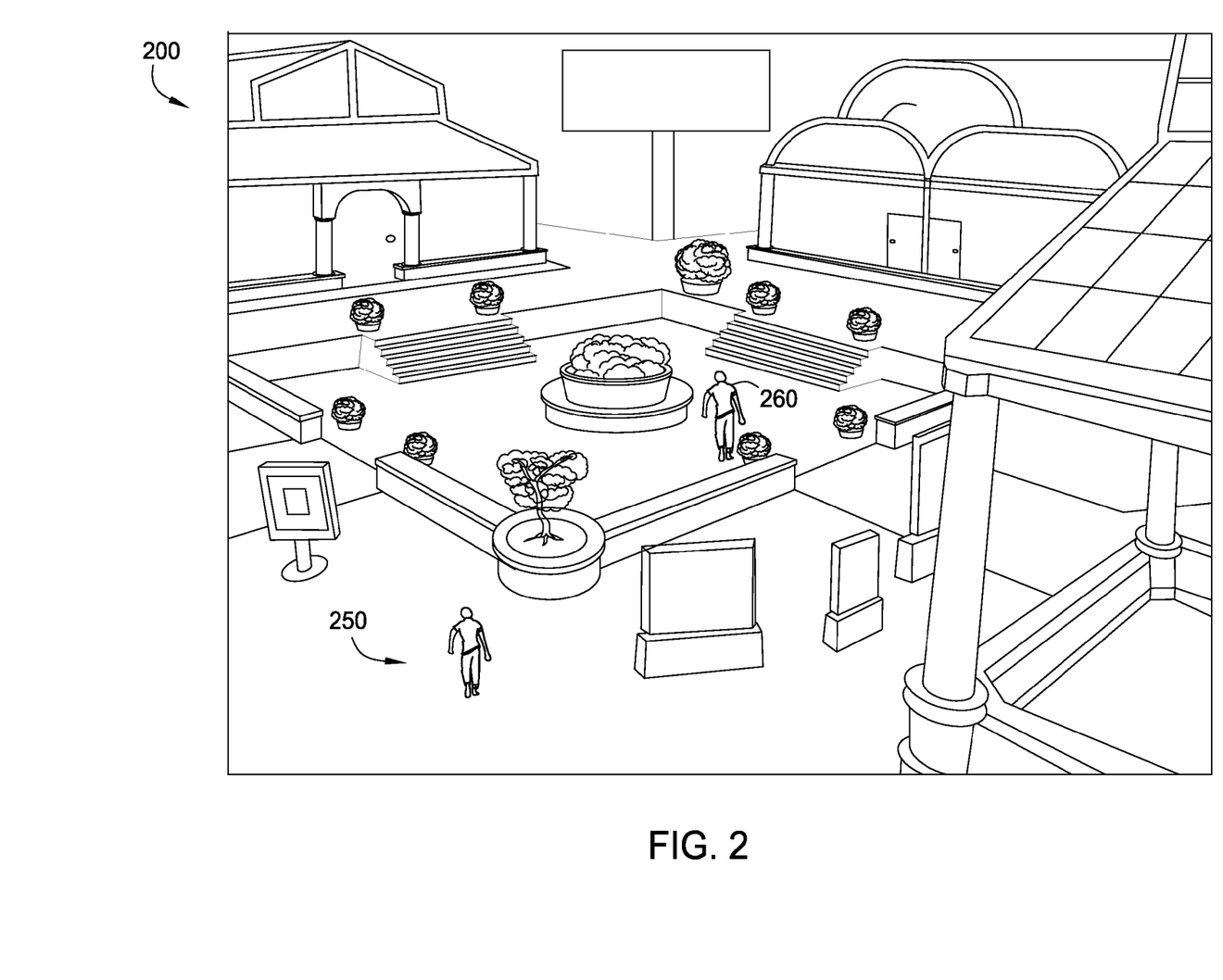
FIG. 2 illustrates a user display for a user participating in a virtual world, according to one embodiment of the invention.

By way of example, FIG. 2 illustrates a user display 200 for a user participating in a virtual world, according to one embodiment of the invention. In this example, the user is represented by avatar 250, and is present in a virtual town square. The user may interact with elements of the virtual world, including an avatar 260, which represents another user. For example, the user may control avatar 250 to initiate a contact with avatar 260, thus enabling the user to communicate with the other user. Note that avatar 250 does not necessarily reflect the physical appearance of the user. For example, a child user of a virtual world may be represented by an "adult" avatar 250 which may not accurately reflect the age of the child user. In such a situation, other users may interact with avatar 250 without realizing that they are interacting with a child.

Returning to FIG. 1, the user may view the virtual world using a display device 140, such as an LCD or CRT monitor display, and interact with the client application 109 using input devices 150. Further, in one embodiment, the user may interact with the client application 109 and the virtual world 130 using a variety of virtual reality interaction devices 160. For example, the user may don a set of virtual reality goggles that have a screen display for each lens. Further, the goggles could be equipped with motion sensors that cause the view of the virtual world presented to the user to move based on the head movements of the individual. As another example, the user could don a pair of gloves configured to translate motion and movement of the user's hands into avatar movements within the virtual reality environment. Of course, embodiments of the invention are not limited to these examples and one of ordinary skill in the art will readily recognize that the invention may be adapted for use with a variety of devices configured to present the virtual world to the user and to translate movement/motion or other actions of the user into actions performed by the avatar representing that user within the virtual world 130.

In one embodiment, the child monitor 105 provides a software program configured to protect the child by detecting inappropriate interactions with other users, and to respond to such interactions by taking preventative actions to mitigate harm to the child. The child monitor 105 may detect inappropriate interactions by examining characteristics of any interactions between a child and another user, according to one embodiment. For example, the child monitor 105 may monitor the child's communications (e.g., emails, instant messages, text chat, voice chat, etc.) to search for keywords or phrases which may indicate stress or discomfort on the part of the child (e.g., "I'm scared," "Go away!," "You're weird"). Further, the child monitor 105 may search for keywords or phrases included in the communications which may indicate inappropriate behavior, such as violent or threatening language, obscenities, requests for personal information, sexual questions or proposals, drug-related language, offers of business transactions, and the like.

Additionally, the child monitor 105 may be configured to detect actions directed at the child's avatar which may be abusive, such as an attack by another avatar, rude gestures by another avatar, stalking, etc. Further, the child monitor 105 may be configured to detect other actions that are allowed in the virtual world, but which may be inappropriate for a child, for example business/financial transactions between avatars, virtual sex, sending/receiving gifts, and the like. Note that, in the situation that the child user is represented by an "adult" avatar (e.g., the avatar 250 shown in FIG. 2), another user may initiate such interactions without being aware of the actual age of the child user.

The child monitor 105 may also be configured to detect inappropriate interactions by monitoring physical signs of stress in the child. In one embodiment, the child monitor 105 may analyze signals received from the stress detection devices 170, representing any device configured to measure and/or detect physical indications of stress in the child. For example, the stress detection devices 170 may include a video or still-image camera configured to analyze facial gestures of the child, an audio processor configured to analyze the child's voice, sensors measuring the child's heart rate and breathing rate, a electrical resistance measurement of the child's skin, and the like. Additionally, the child monitor 105 may be configured to receive software commands given within the client application 109 to explicitly indicate discomfort on the part of the user. For example, the child monitor 105 may receive a signal triggered by the child clicking on a screen icon in order to indicate discomfort, such as clicking on a "Call for help" button included in the user interface of the virtual world.

In one embodiment, the child monitor 105 may be further configured to analyze indications of inappropriate interactions in order to determine a level of severity for the interaction. That is, to determine the degree of potential harm to the child resulting from the interaction, ranging from harmless (e.g., talking to a friend, making a legitimate purchase, etc.) to harmful (e.g., bullying, fraud, abuse by a sexual predator, etc.). As used herein, potential harm may include at least physical, psychological or financial harm. The determination of the level of severity may be based on the level of stress or discomfort detected with the stress detection devices 170, according to one embodiment. That is, detecting a higher level of discomfort may correspond to determining a greater level of severity. The determination of the level of severity may also be based on characteristics of communications in the interaction, for example the nature of the interaction, key words used in any communications, any history of past interactions, and the like. Additionally, the level of severity may reflect whether the other user is someone who is trusted by the child. For example, certain types of interactions may be assigned a low level of severity if the other user is included in an approved list of friends or contacts for the child. Such a list of trusted contacts may be managed, for example, by the child or by his parents.

In one embodiment, the child monitor 105 may be further configured to determine and carry out preventative actions to protect the child. The preventative actions may be determined based on a level of severity of the inappropriate interaction. That is, stronger preventative actions may be performed in response to increasing levels of severity. For example, in a situation that is determined to have a low level of severity, the child monitor 105 may perform the preventative action of recording the interaction for later review (e.g., saving text messages, capturing screen shots, etc.). Further, in a situation that is determined to have a higher level of severity, the child monitor 105 may respond by notifying the parents (e.g., by email, text message, and the like). Optionally, in such a situation, the parents may be provided with an interface to intervene in the virtual world (e.g., to observe the interaction, to terminate the child's use of the virtual world, and the like). If the parent determines that the interaction is not inappropriate (i.e., if the child monitor 105 gave a "false alarm"), the parent may use the provided interface to manually lower the level of severity assigned to the interaction, thus allowing the child to continue to use the virtual world.

Additionally, in a situation that is determined to have a critical level of severity (i.e., there is a clear risk of harm to the child), the child monitor 105 may respond by automatically removing the child from the situation (e.g., by teleporting the child's avatar to another part of the virtual world, by terminating the child's use of the virtual world, etc.). Optionally, in situations having a high level of severity, the child monitor 105 may respond by notifying a non-parental authority (e.g., an administrator of the virtual world, a police department, etc.) of the other user's actions. Thereafter, the other user may be banned from the virtual world, or may be subject to legal measures in the real world.

In one embodiment, the server system 120 includes a CPU 122, which obtains instructions and data via a bus 121 from memory 126 and storage 124. The processor 122 could be any processor adapted to support the methods of the invention. The memory 126 is any memory sufficiently large to hold the necessary programs and data structures. Memory 126 could be one or a combination of memory devices, including Random Access Memory, nonvolatile or backup memory, (e.g., programmable or Flash memories, read-only memories, etc.). In addition, memory 126 and storage 124 may be considered to include memory physically located elsewhere in a server 120, for example, on another computer coupled to the server 120 via bus 121. The server system 120 may be operably connected to the network 115, which generally represents any kind of data communications network. Accordingly, the network 115 may represent both local and wide area networks, including the Internet.

Memory 126 includes a virtual world 130 and an abuse tracker 128. In one embodiment, the virtual world 130 may be a software application that allows a user to explore and interact with an immersive environment. The abuse tracker 128 may be a software application configured to receive data describing instances of abusive behavior (i.e., inappropriate interactions that are harmful to a child) from one or more child monitors 105 included in various client computers 110.

In one embodiment, the data collected by the abuse tracker 128 may be persistently stored in a set of abuse records 124, which may be included in storage 123. The abuse records 124 may be used, for example, to identify a pattern of abusive behavior by a user of the virtual world 130. Thereafter, an administrator may use the identified pattern to determine whether to ban the user (i.e., to block the user from further access to the virtual world 130). Additionally, in the case of potential criminal behavior on the part of the user, the abuse records 124 may be used as evidence in legal proceedings in the real world.

In one embodiment, the child monitor 105 and/or the abuse tracker 128 may be configured to identify inappropriate interactions based on definitions of inappropriate interactions 125, which may be included in storage 123. The definitions of inappropriate interactions 125 may represent profiles of one or more situational characteristics that are specified as indicating inappropriate interactions. For example, the definitions of inappropriate interactions 125 may specify keywords or phrases which, when included in a child's communications, may indicate inappropriate behavior or stress. In another example, the definitions of inappropriate interactions 125 may specify threshold values of physical measurements (e.g., heart rate, breathing rate, skin resistance, etc.) that may indicate stress in a child.

Of course, the embodiments described above are intended to be illustrative, and are not limiting of the invention. Other embodiments are broadly contemplated. For example, the definitions of inappropriate interactions 125 may be stored in the client storage 104. In another example, the functionality of the child monitor 105 may be incorporated into the abuse tracker 128. That is, the abuse tracker 128 may be configured to detect inappropriate interactions involving children, and to respond to such situations by performing actions to prevent harm to the children.

Figure 3:
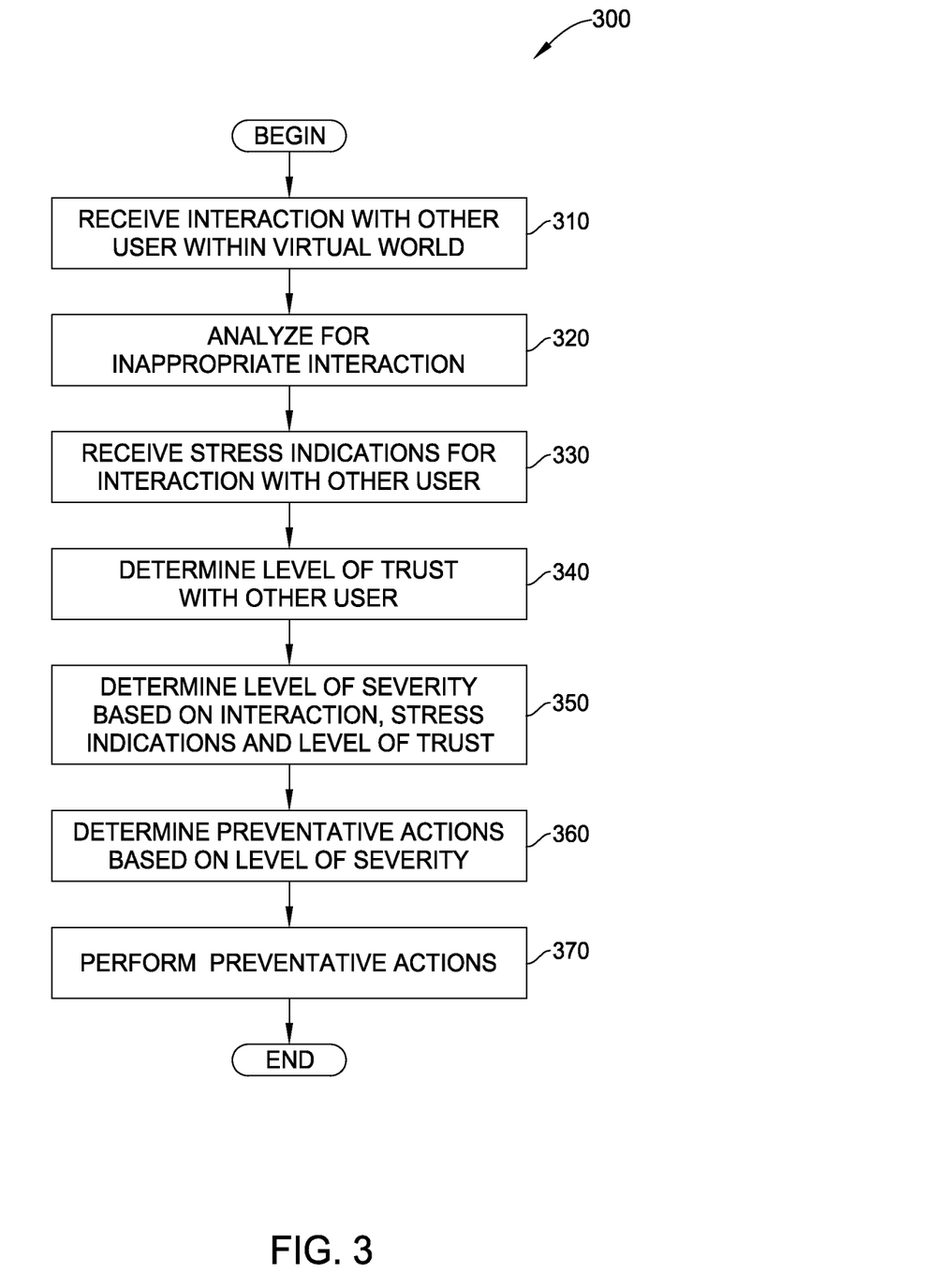
FIG. 3 is a flow diagram illustrating a method for protecting a child user from inappropriate interactions within a virtual world, according to one embodiment of the invention.

FIG. 3 is a flow diagram illustrating a method 300 for protecting a child user from inappropriate interactions within a virtual world, according to one embodiment of the invention. Persons skilled in the art will understand that, even though the method is described in conjunction with the system of FIG. 1, any system configured to perform the steps of the method 300, in any order, is within the scope of the present invention.

The method 300 begins at step 310, by receiving an interaction of a child user with another user of a virtual world (e.g., virtual world 130 illustrated in FIG. 1). Such an interaction may include a communication (e.g., email, instant message, text chat, voice chat, etc.), or an avatar action within the virtual world (e.g., a gesture, attack, transfer of virtual items, financial transaction, virtual sex, etc.).

At step 320, the received interaction may be analyzed for indications of an inappropriate interaction. For example, a child monitor 105 may determine if any communications taking place in the interaction include keywords or phrases which may indicate stress or discomfort on the part of the child, violent or threatening language, obscenities, requests for personal information, sexual questions or proposals, drug-related language, offers of business transactions, and the like. In another example, the child monitor 105 may determine if interactions directed at the child's avatar which may be abusive, such as an attack by another avatar, rude gestures by another avatar, etc. In yet another example, the child monitor 105 may determine if the interaction includes any avatar actions that may be inappropriate for a child (e.g., business/financial transactions between avatars, virtual sex, etc.).

At step 330, stress indications for the child may be received. Such indications may include measured and/or detected physical indications of stress in the child. For example, the child monitor 105 may analyze signals received from the stress detection devices 170, which may include, e.g., a video or still-image camera configured to analyze facial gestures of the child, an audio processor configured to analyze the child's voice, a sensor measuring the child's heart rate, and the like. Additionally, the received stress indications may include software commands performed by the child to explicitly indicate discomfort in a given situation. For example, the child monitor 105 may receive user commands performed by the child within the client application 109 to indicate discomfort, such as clicking on a "Call for help" button included in the user interface of the virtual world. In one embodiment, steps 320 and 330 may be performed by comparing the child's current situation to stored definitions of inappropriate interactions. For example, the child monitor 105 may be configured to interact with the definitions of inappropriate interactions 125 included in storage 123.

At step 340, a level of trust towards the other user may be determined. The level of trust may be based on, for example, whether the other user is included in an approved list of friends or contacts for the child. Such a list may be managed, for example, by the child or by his parents. The level of trust may be determined, for example, by the child monitor 105, and may be based on a list or table of authorized contacts for the child that may be specified by a parent. Such a list or table may be stored, e.g., in client storage 104.

At step 350, a level of severity for the interaction may be determined, based on indications of an inappropriate interaction, indications of stress in the child, and the level of trust of the child for the other user. For example, the child monitor 105 may be configured to evaluate these factors, and to determine a level of severity according to the degree of potential harm to the child resulting from the interaction.

At step 360, preventative actions may be determined based on the level of severity determined for the interaction. For example, the child monitor 105 may be configured to determine actions to be taken in response to the level of severity of the interaction. In one embodiment, an interaction determined to have an increasing level of severity may result in determining actions that are progressively stronger in protecting the child. For example, determining a particular action may be based on reaching a predefined threshold level of severity for the interaction. A correspondence between actions and thresholds of severity may be defined, e.g., by a parent or a system administrator. Preventative actions which may be performed at step 360 are discussed in greater detail below with reference to FIG. 4. At step 370, the determined preventative actions may be performed to protect the child. After step 370, the method 300 terminates.

Figure 4:
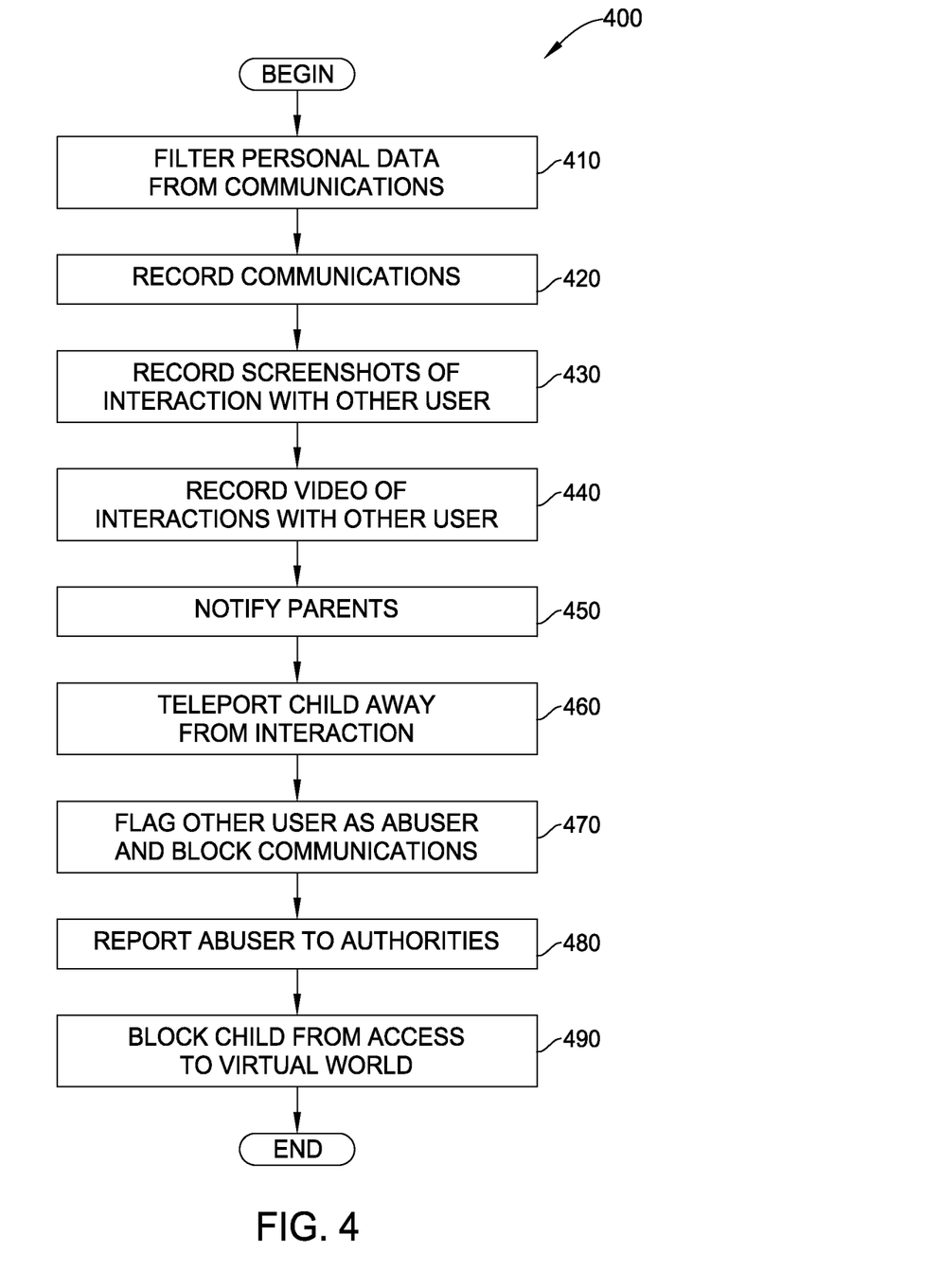
FIG. 4 is a flow diagram illustrating a method for performing preventative actions to protect a child user of a virtual world, according to one embodiment of the invention.

FIG. 4 is a flow diagram illustrating a method 400 for performing preventative actions to protect a child user of a virtual world, according to one embodiment of the invention. For the sake of illustration, method 400 is described in conjunction with the system of FIG. 1. However, persons skilled in the art will understand that any system configured to perform the steps of method 400, in any order, is within the scope of the present invention.

The method 400 represents one embodiment of the step 360 of the method 300 illustrated in FIG. 3. Thus, assume that the steps of method 400 are performed incrementally, in response to determining increasing levels of severity detected for an interaction involving a child user. The method 400 begins at step 410, where personal data may be filtered from any communications occurring during the interaction. For example, the child monitor 105 may detect personal data (e.g., the child's name, age, email address, physical address, etc.) included in a communication, and may remove or mask that data from the communication.

At step 420, any communications occurring during the interaction may be recorded for later review. For example, the child monitor 105 may be configured to save transcripts of text messages, to record voice conversations, and the like. At step 430, screen shots of the interaction within the virtual world may be recorded. For example, child monitor 105 may capture screenshots of a user display 200 showing an interaction between the avatar 250 of the child and the avatar 260 of the other user, as shown in FIG. 2. At step 440, at a higher level of severity for the interaction, video of the interaction within the virtual world may be recorded. For example, the child monitor 105 may capture video images of the interaction, which may be stored in the client storage 104.

At step 450, the parents of the child may be notified of the interaction. For example, the child monitor 105 may notify the parents of the interaction by, e.g., email, text message, etc. At step 460, the child may be teleported away from the interaction. For example, the child monitor 105 may "move" the child to a different location of the virtual world, thereby ending the interaction with the other user.

At step 470, in situations where the other user is determined to be engaging in abusive behavior, the other user may be flagged as an abuser, and further communications with that user may be blocked. For example, the child monitor 105 may track other users flagged as abusers, and may block the child from communicating with them. At step 480, a user flagged as an abuser may be reported to a responsible authority for the virtual world. For example, the child monitor 105 may send a notification of abusive conduct to a system administrator in charge of the virtual world 130. Such reports may be received by the abuse tracker 128, and may be stored in the abuse records 124, as illustrated in FIG. 1. In some situations, child monitor 105 or abuse tracker 128 may be configured to notify an authority in the real world, such as a police department. At step 480, the child may be blocked from access to the virtual world. For example, the child monitor 105 may be configured to prevent a child from accessing the virtual world 130. After step 480, the method 400 terminates.

Figure 5:
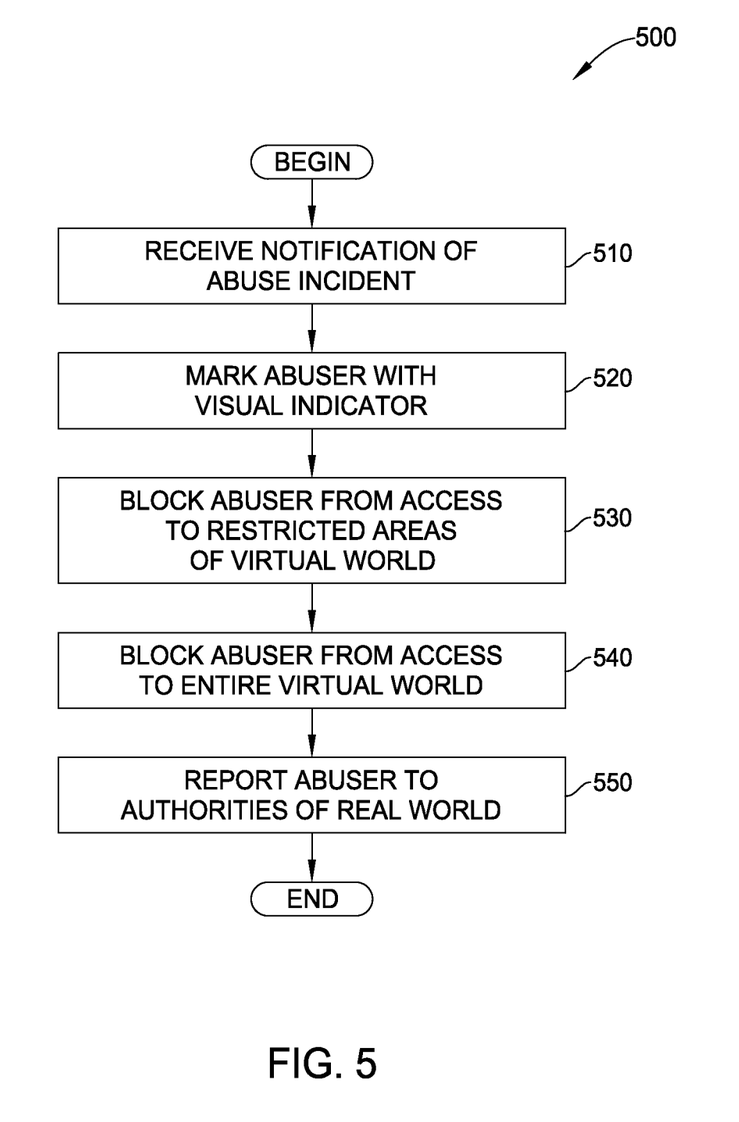
FIG. 5 is a flow diagram illustrating a method for tracking abusive behavior towards child users of a virtual world, according to one embodiment of the invention.

FIG. 5 is a flow diagram illustrating a method 500 for tracking abusive behavior towards child users of a virtual world, according to one embodiment of the invention. Method 500 may be performed on a central server (e.g., server system 120), in order to monitor abusive behavior on the part of users of a virtual world. However, persons skilled in the art will understand that, even though the method is described in conjunction with the system of FIG. 1, any system configured to perform the steps of method 500, in any order, is within the scope of the present invention.

In one embodiment, the steps of method 500 may be performed incrementally, in response to determining increasing levels of severity of actions performed by an abusive user during the course of an interaction involving a child. Additionally, the steps of method 500 may be performed incrementally in response to a history or pattern of abusive behavior on the part of the abuser. That is, in cases of abusers having demonstrated a long history or clear pattern of abusive behavior, stronger preventative actions may be performed in response.

The method 500 begins at step 510, by receiving a notification of an incident of abuse of a young user of a virtual world (e.g., the virtual world 130 illustrated in FIG. 1). For example, an abuse tracker 128 included in server system 120 may receive a notification of abusive behavior from a child monitor 105 included in a client computer 110, as shown in FIG. 1. The notification may have been sent by the child monitor 105 as part of step 480 of method 400, as described above.

At step 520, if the notification indicates a low level of abusive behavior (e.g., an interaction having a low level of severity), the abuser may be marked with a visual indicator that is visible to other users of a virtual world. For example, abuse tracker 128 may modify the image presented by virtual world 130, such that the avatar of the abuser is displayed with a visual indicator (e.g., a symbol, text label, color codes, etc.) for a reported abuser. Such visual indicators may serve as a warning to other users to avoid certain types of interactions with the indicated avatar. Additionally, abuse tracker 128 may evaluate abuse records 124 included in storage 123, in order to evaluate a history or pattern of abusive behavior. The existence of a history or pattern of abusive behavior may result in determining a higher level of abusive behavior, thus causing stronger preventative actions to be performed by abuse tracker 128.

At step 530, in the case of a medium level of abusive behavior, the abuser may be blocked from access to areas of the virtual world that are specified as restricted. For example, the abuse tracker 128 may block an abuser from accessing areas of the virtual world 130 that are intended for use by children (e.g., educational areas, amusement parks, etc.). At step 540, in the case of a higher level of abusive behavior, the abuser may be blocked from access to the virtual world entirely. For example, the abuse tracker 128 may block an abuser from any access to the virtual world 130. At step 550, in the case of a highest level of abusive behavior, the abuser may be reported to real-world authorities (e.g., a police department). This action may include sending any collected evidence of abusive behavior, including transcripts, screenshots, and video of the abuse incident, as well as any records of past incidents of abusive behavior (e.g., incident records stored in the abuse records 124). After step 550, the method 500 terminates.

Of course, methods 300, 400 and 500 are provided for illustrative purposes only, and are not limiting of the invention. It is contemplated that the steps of method 300, 400 and 500 may be performed in a different order or combination, depending on the severity of the interaction. Further, methods 300, 400 and 500 may be modified to incorporate other preventative actions. Such modifications may be made to suit particular situations, and are thus contemplated to be in the scope of the invention.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
   providing, on a computer readable storage medium, a plurality of definitions of inappropriate interactions between users of a virtual environment, the inappropriate interactions being defined on a basis of leading to potential harm to users of the virtual environment;
   receiving one or more indications of an interaction between a first user and a second user of the virtual environment, and
   upon determining that the one or more indications correspond to at least one of the plurality of definitions of inappropriate interactions:
      adding, to a plurality of records of previous inappropriate interactions, a record of the inappropriate interaction;
      identifying from the plurality of records a pattern of inappropriate interactions for the second user, wherein at least one of the inappropriate interactions in the identified pattern is one of the plurality of previous inappropriate interactions;
      identifying one or more potential victims of the second user from among the users of the virtual environment using a victim profile developed from the identified pattern of inappropriate interactions, the victim profile describing common characteristics of potential victims of abuse from the second user; and
      performing one or more actions to prevent abuse by the second user to the one or more potential victims that match the victim profile in the virtual environment.

2. The computer-implemented method of claim 1, wherein the one or more actions to prevent abuse by the second user comprise notifying one or more responsible authorities.

3. The computer-implemented method of claim 1, wherein the one or more actions to prevent abuse by the second user comprise blocking the second user from any interactions with the one or more potential victims.

4. The computer-implemented method of claim 1, wherein the one or more actions to prevent abuse by the second user comprise blocking the second user from access to one or more areas of the virtual environment.

5. The computer-implemented method of claim 1, wherein the one or more actions to prevent abuse by the second user comprise marking the second user with a visual indicator intended to indicate an abuser to other users of the virtual environment.

6. The computer-implemented method of claim 1, wherein the one or more actions to prevent abuse by the second user comprise, upon beginning an interaction with the second user, providing the one or more potential victims with a warning of the identified pattern of inappropriate interactions for the second user.

7. The computer-implemented method of claim 1, wherein the one or more actions to prevent abuse by the second user comprise recording a copy of any communication taking place during any interactions between the second user and other users of the virtual environment.

8. A computer-readable non-transitory storage medium containing a program, which when executed on a processor performs an operation, comprising:
   providing, on a computer readable storage medium, a plurality of definitions of inappropriate interactions between users of a virtual environment, the inappropriate interactions being defined on a basis of leading to potential harm to users of the virtual environment;
   receiving one or more indications of an interaction between a first user and a second user of the virtual environment, and
   upon determining that the one or more indications correspond to at least one of the plurality of definitions of inappropriate interactions:
      adding, to a plurality of records of previous inappropriate interactions, a record of the inappropriate interaction;
      identifying from the plurality of records a pattern of inappropriate interactions for the second user, wherein at least one of the inappropriate interactions in the identified pattern is one of the plurality of previous inappropriate interactions;
      identifying one or more potential victims of the second user from among the users of the virtual environment using a victim profile developed from the identified pattern of inappropriate interactions, the victim profile describing common characteristics of potential victims of abuse from the second user; and
      performing one or more actions to prevent abuse by the second user to the one or more potential victims that match the victim profile in the virtual environment.

9. The computer-readable storage medium of claim 8, wherein the one or more actions to prevent abuse by the second user comprise notifying one or more responsible authorities.

10. The computer-readable storage medium of claim 8, wherein the one or more actions to prevent abuse by the second user comprise blocking the second user from any interactions with the one or more potential victims.

11. The computer-readable storage medium of claim 8, wherein the one or more actions to prevent abuse by the second user comprise blocking the second user from access to one or more areas of the virtual environment.

12. The computer-readable storage medium of claim 8, wherein the one or more actions to prevent abuse by the second user comprise marking the second user with a visual indicator intended to indicate an abuser to other users of the virtual environment.

13. The computer-readable storage medium of claim 8, wherein the one or more actions to prevent abuse by the second user comprise, upon beginning an interaction with the second user, providing the one or more potential victims with a warning of the identified pattern of inappropriate interactions for the second user.

14. The computer-readable storage medium of claim 8, wherein the one or more actions to prevent abuse by the second user comprise recording a copy of any communication taking place during any interactions between the second user and other users of the virtual environment.

15. A system, comprising:
a processor; and
a memory containing a program, which when executed by the processor is configured to perform the steps of:
providing, on a computer readable storage medium, a plurality of definitions of inappropriate interactions between users of a virtual environment, the inappropriate interactions being defined on a basis of leading to potential harm to users of the virtual environment;
receiving one or more indications of an interaction between a first user and a second user of the virtual environment, and
upon determining that the one or more indications correspond to at least one of the plurality of definitions of inappropriate interactions:
adding, to a plurality of records of previous inappropriate interactions, a record of the inappropriate interaction;
identifying from the plurality of records a pattern of inappropriate interactions for the second user, wherein at least one of the inappropriate interactions in the identified pattern is one of the plurality of previous inappropriate interactions;
identifying one or more potential victims of the second user from among the users of the virtual environment using a victim profile developed from the identified pattern of inappropriate interactions, the victim profile describing common characteristics of potential victims of abuse from the second user; and
performing one or more actions to prevent abuse by the second user to the one or more potential victims that match the victim profile in the virtual environment.

16. The system of claim 15, wherein the one or more actions to prevent abuse by the second user comprise notifying one or more responsible authorities.

17. The system of claim 15, wherein the one or more actions to prevent abuse by the second user comprise blocking the second user from any interactions with the one or more potential victims.

18. The system of claim 15, wherein the one or more actions to prevent abuse by the second user comprise blocking the second user from access to one or more areas of the virtual environment.

19. The system of claim 15, wherein the one or more actions to prevent abuse by the second user comprise marking the second user with a visual indicator intended to indicate an abuser to other users of the virtual environment.

20. The system of claim 15, wherein the one or more actions to prevent abuse by the second user comprise, upon beginning an interaction with the second user, providing the one or more potential victims with a warning of the identified pattern of inappropriate interactions for the second user.

21. The system of claim 15, wherein the one or more actions to prevent abuse by the second user comprise recording a copy of any communication taking place during any interactions between the second user and other users of the virtual environment.

* * * * *